US010683670B1

(12) United States Patent
Rush (10) Patent No.: US 10,683,670 B1
(45) Date of Patent: Jun. 16, 2020

(54) HAND-HELD TOOL FOR SPACING CLAPBOARDS WITH BUILT-IN EXTENDIBLE RULER

(71) Applicant: David Rush, Homer, AK (US)

(72) Inventor: David Rush, Homer, AK (US)

(*) Notice: Subject to any disclaimer, the term of this patent is extended or adjusted under 35 U.S.C. 154(b) by 272 days.

(21) Appl. No.: 15/924,092

(22) Filed: Mar. 16, 2018

(51) Int. Cl.
*E04F 21/18* (2006.01)
*G01B 5/14* (2006.01)

(52) U.S. Cl.
CPC .......... *E04F 21/18* (2013.01); *E04F 21/1855* (2013.01); *G01B 5/14* (2013.01)

(58) Field of Classification Search
CPC .............................. E04F 21/18; E04F 21/1855
USPC ............................ 33/647, 411, 646, 648, 649
See application file for complete search history.

(56) References Cited

U.S. PATENT DOCUMENTS

| | | | | |
|---|---|---|---|---|
| 172,292 A * | 1/1876 | Babcock | ............. | E04F 21/1855 33/646 |
| 239,390 A * | 3/1881 | Kivett | ................. | E04F 21/1855 33/647 |
| 318,280 A * | 5/1885 | Moberg | ............. | E04F 21/1855 33/646 |
| 325,811 A * | 9/1885 | Benson et al. | ...... | E04F 21/1855 33/647 |
| 390,041 A * | 9/1888 | Stanley et al. | ...... | E04F 21/1855 33/647 |
| 418,754 A * | 1/1890 | Schill | .................. | E04F 21/1855 33/646 |
| 1,115,202 A * | 10/1914 | Ingles | ................. | E04F 21/1855 33/646 |
| 3,548,505 A * | 12/1970 | Candilo | .................. | E04F 21/22 33/527 |
| 3,792,852 A * | 2/1974 | Reniker | ............. | E04F 21/1855 269/95 |
| 5,335,423 A * | 8/1994 | McLaughlin | ....... | E04F 21/1855 33/646 |
| 7,159,328 B1 * | 1/2007 | Duda | ....................... | B25H 7/04 33/370 |
| 8,656,603 B1 * | 2/2014 | Rush | ................... | E04F 21/1855 33/613 |
| 2003/0014877 A1 * | 1/2003 | Nadal | ................. | E04F 21/1855 33/647 |

* cited by examiner

*Primary Examiner* — Christopher W Fulton
(74) *Attorney, Agent, or Firm* — Michael J. Tavella (57) ABSTRACT

A hand-held tool for spacing clapboards that includes a speed square tongue located in the top center of the device. This feature allows a user to quickly and accurately transfer both horizontal and vertical lines, revealing material to be removed around doors and windows. There is a trigger mounted on the ergonomic handle that both locks the tongue in place for transferring horizontal lines, and releases the tongue for transferring vertical lines. Two trays are adjustable in ¼" increments that use pull pins under the trays. The trays can be adjusted for any board up to 10" in height. Desired overlap is achieved by adjusting the position of the bottom tray as desired. Finally a ruler is provided along the side of the tool. A second model that has no handle is also taught.

17 Claims, 12 Drawing Sheets

HAND-HELD TOOL FOR SPACING CLAPBOARDS WITH BUILT-IN EXTENDIBLE RULER

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to tools for spacing clapboards and particularly to hand-held tools for spacing clapboards.

2. Description of the Prior Art

The installation of clapboard siding is an age-old practice. Despite being centuries old, the practice of installing clapboards has one major problem. The installation requires the clapboards to be positioned at the correct height to provide proper spacing of the boards. Normally, installation crews have to mark out spacing using a variety of gauges and chalk lines to ensure proper spacing. This takes a lot of time and some skill.

Several tools have been invented to make this process easier and more reliable. Examples of some of these are found in following U. S. Patents. First, U.S. Pat. No. 5,094,007 shows an example of gauges—in this case, a sliding gauge based on a ruler. This does little more than set a spacing that can be repeated using the gauge. U.S. Pat. No. 4,937,950 teaches a spacer that has angle flanges that fit against one row of clapboards and a second flange that is used to place the next course upon. This device uses nails to hold it in place. It also is adjustable to change the spacing of the courses as desired. U.S. Pat. No. 7,543,422 teaches a variation of a spacing tool that is also adjustable and is secured to the building to use. U.S. Pat. Nos. 3,792,852 and 1,783,260 teach two more variants of gauges that are secured to the building and are adjustable. U.S. Pat. No. 2,807,094 teaches a simple gauge that has two fixed flanges. The gauge is secured to the side of a hammer and is used to quickly space shingles before nailing. U.S. Pat. No. D338,814 teaches a hand held gauge that is fixed and has two simple flanges for spacing. All of these devices are useful, but lack key features that make installing siding clapboards easier and faster. The adjustable gauges that attach to the house are problematic in that it takes time to nail them up and remove them. Also, the ability to adjust these tools can cause problems in that these tools are usually used in pairs. As such, if one tool is set at a slightly different length, the entire course of clapboards can be installed askew. Moreover, adjustable gauges can become loose and are not easy to maintain in one set position.

The fixed hand-held gauges are the best in that two workers can place clapboards up quickly and easily. The gauges can be quickly positioned, the new clapboard set and checked and nailed in place. The only problem they have is that there is no way to use the gauges when windows, doors and other openings are present. For those cases, the clapboards have to be carefully marked and cut to work around the frames.

In my previous U.S. Pat. No. 8,656,603 a hand held gauge used to install clapboards in one frame. That tool is a hand-held device that has a pair of fixed flanges. These flanges are relatively long and extend out sideways from the handle for several inches on each end. This ensures that the clapboards are held securely and accurately by the tools. With the long flanges of these tools, there is no way to turn the tool at a slight angle, thereby changing the spacing—that is possible when using some narrower tools. The tool has the ability to establish proper measurements for window casings and door frames that can be obtained quickly. This is done using an adjustable gauge, mounted on the side of the handle, that can be extended upward until the casing or frame is reached. Once this spacing is obtained, a worker can quickly transfer the measurement to the next piece of clapboard so that it can be cut. The tool includes a level and a tape measure so that simple measurements can be made without having to put down the tool and get another tool.

While my previous patent covers a useful tool, it lacked functionality in several ways. By having the flanges fixed, it limited its use to set width clapboards. The gauge on the side is useful, but it is not in the best position. Moreover, it is too simple to be fully practical. Moreover, the tool lacked basic ergonomic features.

BRIEF DESCRIPTION OF THE INVENTION

The instant invention overcomes these difficulties and provides an improvement over this tool. It is a hand-held tool for spacing clapboards that includes a speed square tongue located in the top center of the device. This feature allows a user to quickly and accurately transfer both horizontal and vertical lines, revealing material to be removed around doors and windows. There is a trigger mounted on the ergonomic handle that both locks the tongue in place for transferring horizontal lines, and releases the tongue for transferring vertical lines.

Two trays are adjustable in ¼" increments that use pull pins under the trays. The trays can be adjusted for any board up to 10" in height. Desired overlap is achieved by adjusting the position of the bottom tray as desired. Finally a ruler is provided along the side of the tool.

In a second embodiment, for occasional users such as do-it-yourself types, the tool is made without a handle. To use the tool, the users grips the body. It has all of the other features of the handled model; however, it uses a button on the body instead of a trigger to operate the tongue lock.

DETAILED DESCRIPTION OF THE INVENTION

Figure 1:
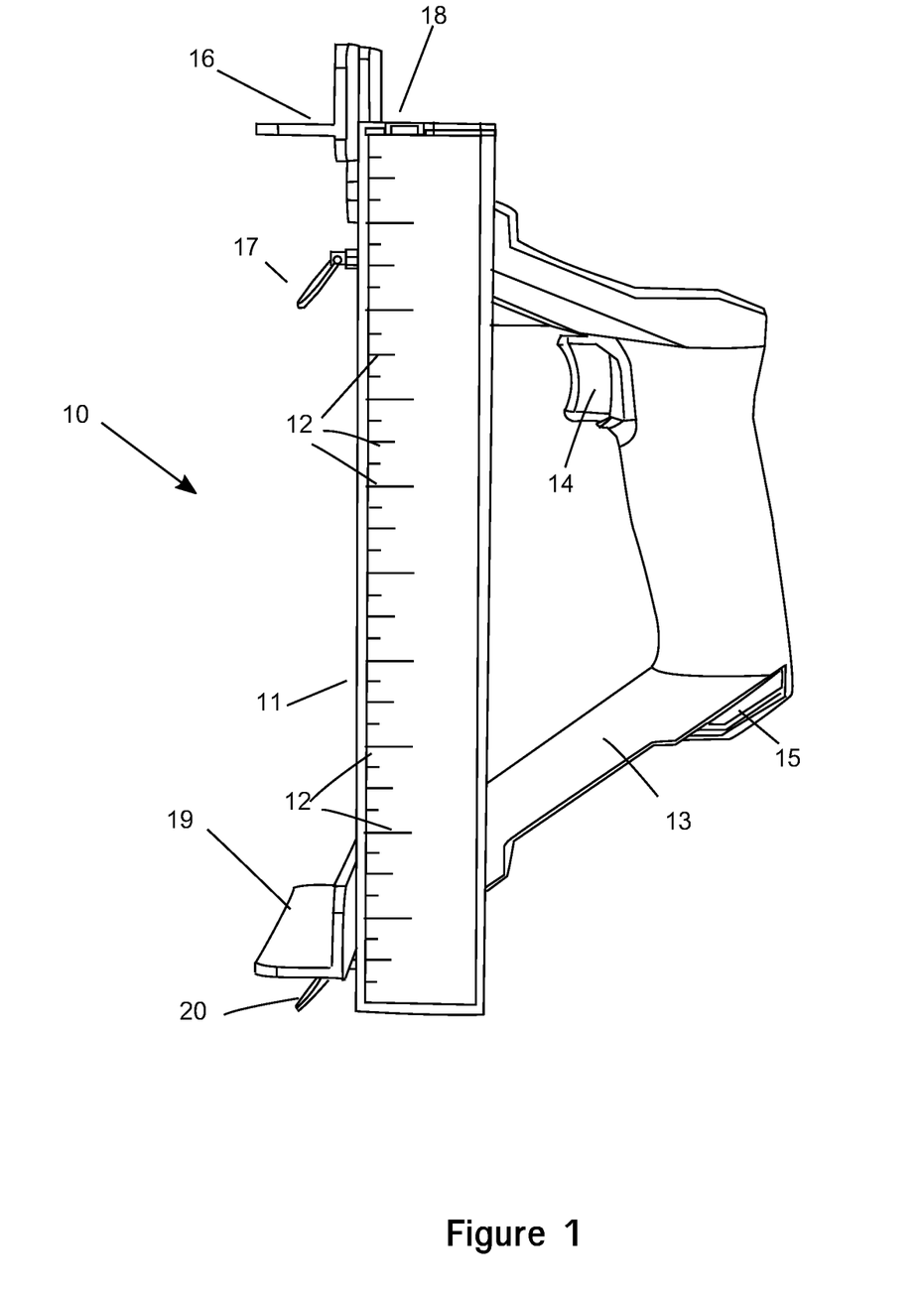
FIG. 1 is a side view of the instant invention.

Referring now to the drawings, and especially, to FIG. 1, a side view of the instant invention 10 is shown. The tool 10 has a generally square, tubular body 11. In the preferred embodiment, the body 11 has ruled markings 12 for measurement on one or both sides. At the back of the body 11 is a handle 13. In the preferred embodiment, the handle has an ergonomic shape. A trigger 14, which is mechanically connected to the tongue mechanism, is provided to release the sliding ruled tongue (as discussed below) so that it can be extended out of the top of the tool and for replacing it back when done. The handle 13 also has a notch 15 for installing a loop for a carabiner so that the tool can be suspended from a user's belt loop.

At the top of the tool 10 is a flange or tray 16 This tray has a blade portion that is secured to the body 11 by a pull pin 17. See FIG. 4 for details on the operation of this pin, Also at the top of the body 11 is a ruled tongue 18 (see FIG. 2). When stored, the tongue 18 is flush with the top of the device. At the bottom of the tool 10 is a second tray 19. This tray is secured, as discussed below, by a pull pin 20. Both pins 17 and 20 are used to allow the trays to slide up or down on the face of the body to enable the user to adjust the trays to match the height of the clapboards being installed.

Figure 2:
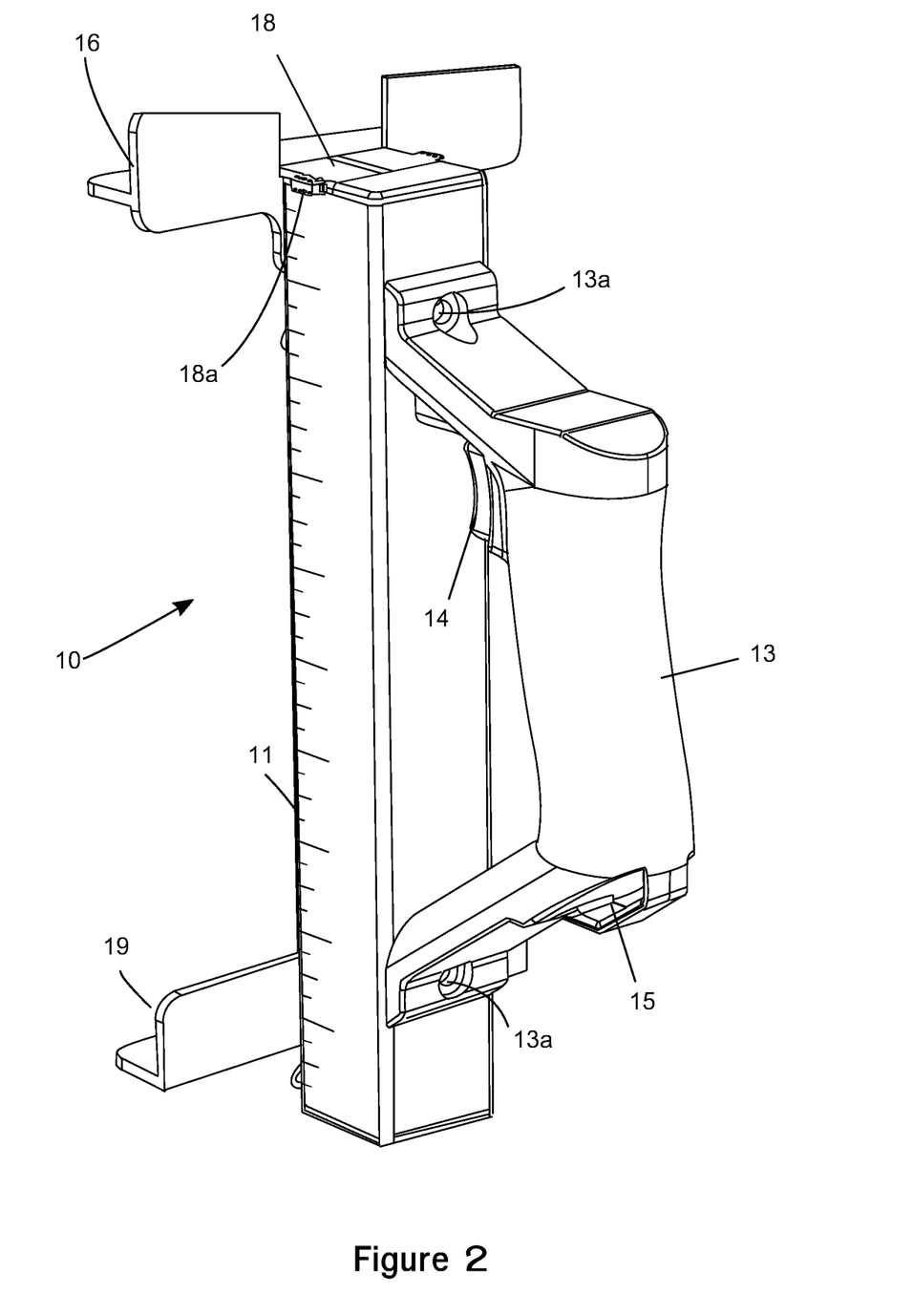
FIG. 2 is partial perspective view of the tool.

FIG. 2 is partial perspective view of the tool 10. In this view, the top of the body 11 is visible. The handle 13 is shown with attachment points 13a being visible. The handle 13 can be attached using screws, rivets or similar fasteners (not shown). Also in this view are portions of the top tray 16 and the bottom tray 19. The top of the ruled tongue 18 is shown. As discussed above, the tongue is shown flush with the surface 16a of the top tray. Also on the top surface of the tongue 18 is a V-groove 21, which is discussed in more detail below.

Figure 3:
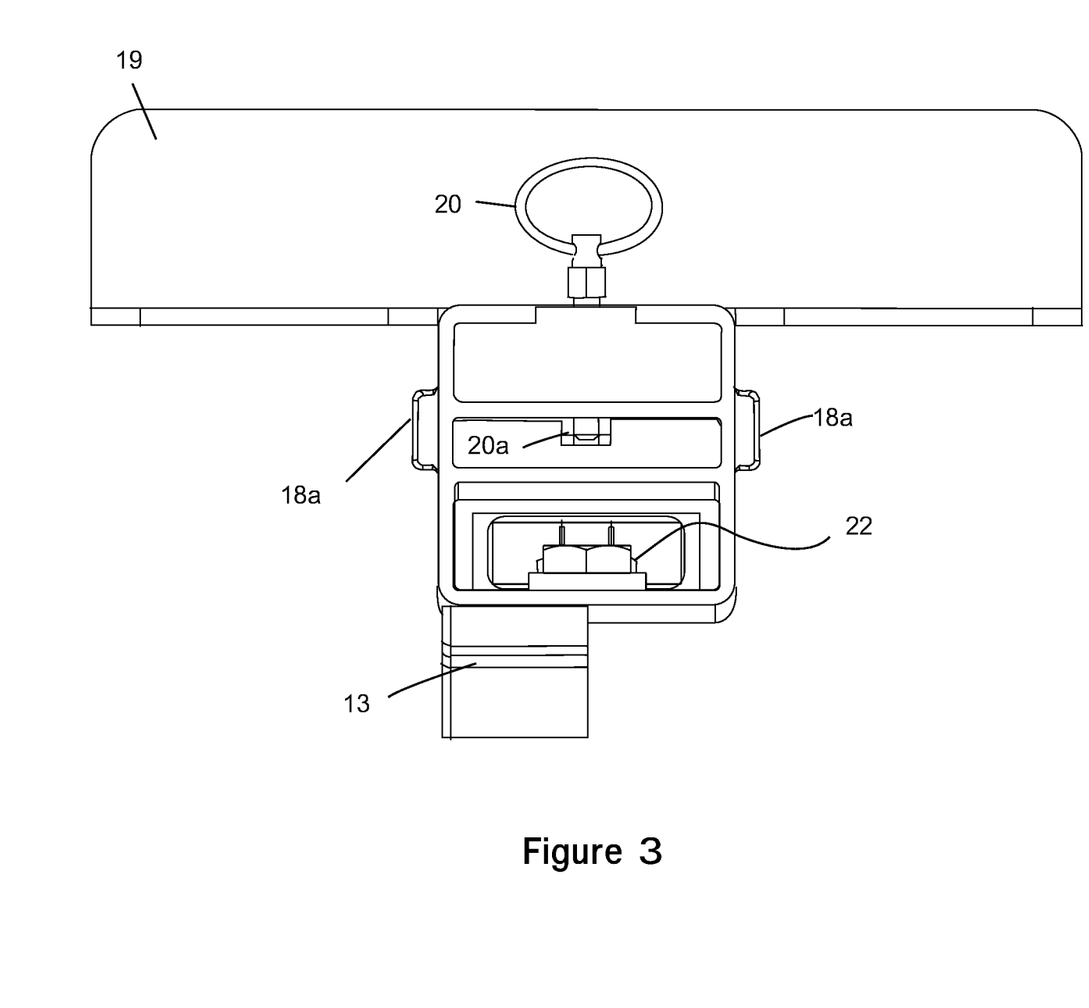
FIG. 3 is a bottom plan view of the tool.

FIG. 3 is a bottom plan view of the tool. In this view, the bottom tray 19 is shown as well as the pull pin 20. Note the end 20a of the lower pull pin is shown installed in the base. This view also shows two small finger grips 18a that are used to raise the ruled tongue 18.

Figure 4:
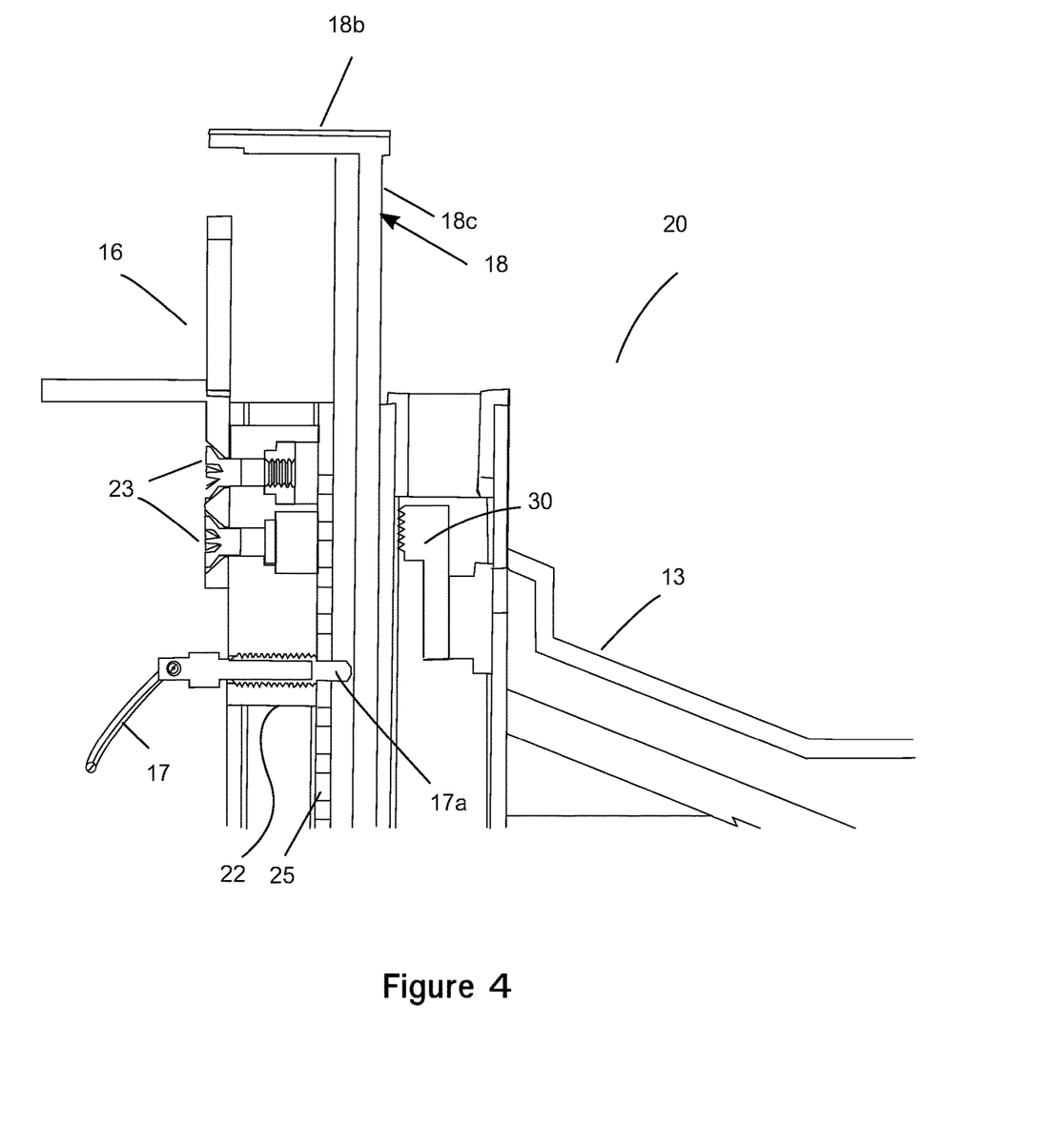
FIG. 4 is a cutaway side view of the upper portion of the tool showing the locking arm.

FIG. 4 is a cutaway side view of the upper portion of the tool. Here, the handle 13 is partially shown. The upper tray 16 is shown. Note that the tray 16 is secured to the slider 22 (see e. g., FIG. 6) by screws 23. As discussed below, the slider 22 slides in a track 24 formed in the body 11. The pull pin 17 is shown penetrating the slider 22. The end 17a of the pin is held in a hole 25 formed in the body 11. There is a series of holes 25 placed in the body 11 that allow both the top tray and the bottom tray to be moved along the body as needed.

This figure also shows the ruled tongue 18 partially extended. The ruled tongue has a top plate 18b and a face plate 18c (see FIG. 8). A locking arm 30 (shown in the unlocked position) is positioned as shown inside of the body 11 it is attached to the trigger 14 so that when the trigger is pulled, the locking arm disengages the tongue and when the trigger is released, the locking arm resets and locks the tongue as shown.

Figure 5:
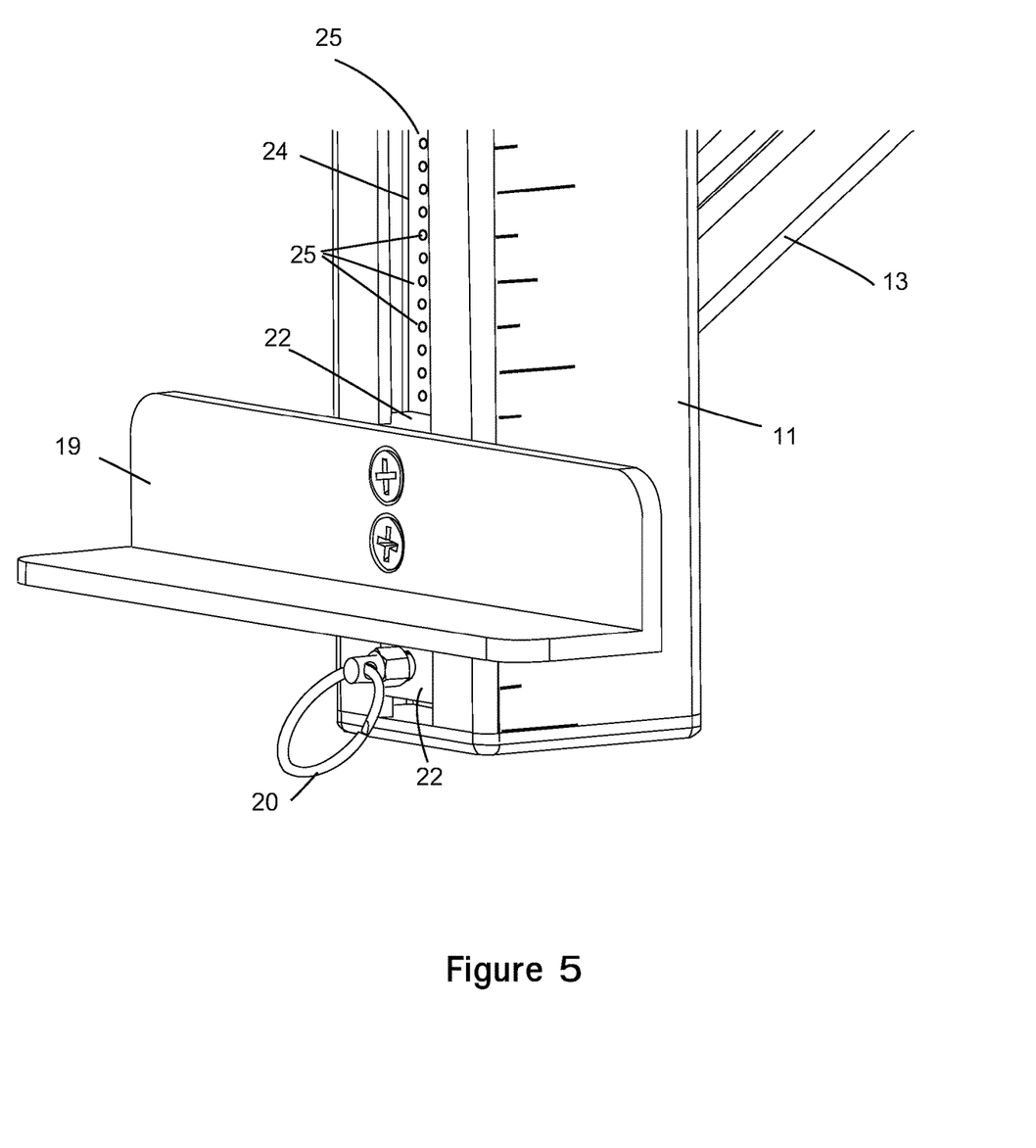
FIG. 5 is a detail of the lower portion of the tool.

FIG. 5 is a detail of the lower portion of the tool 10. In this view, the bottom tray 19 is shown with the pull pin 20 secured in the bottom of the slider 22. Note the screws 23 that secure the tray 19 to the slider 22. As discussed above, the slider 22 rides in the track 24. Note too, the holes 25 that hold the pin 20, which allows the lower tray to be repositioned as needed. Note that a portion of the handle 13 is seen extending from the body 11.

Figure 6:
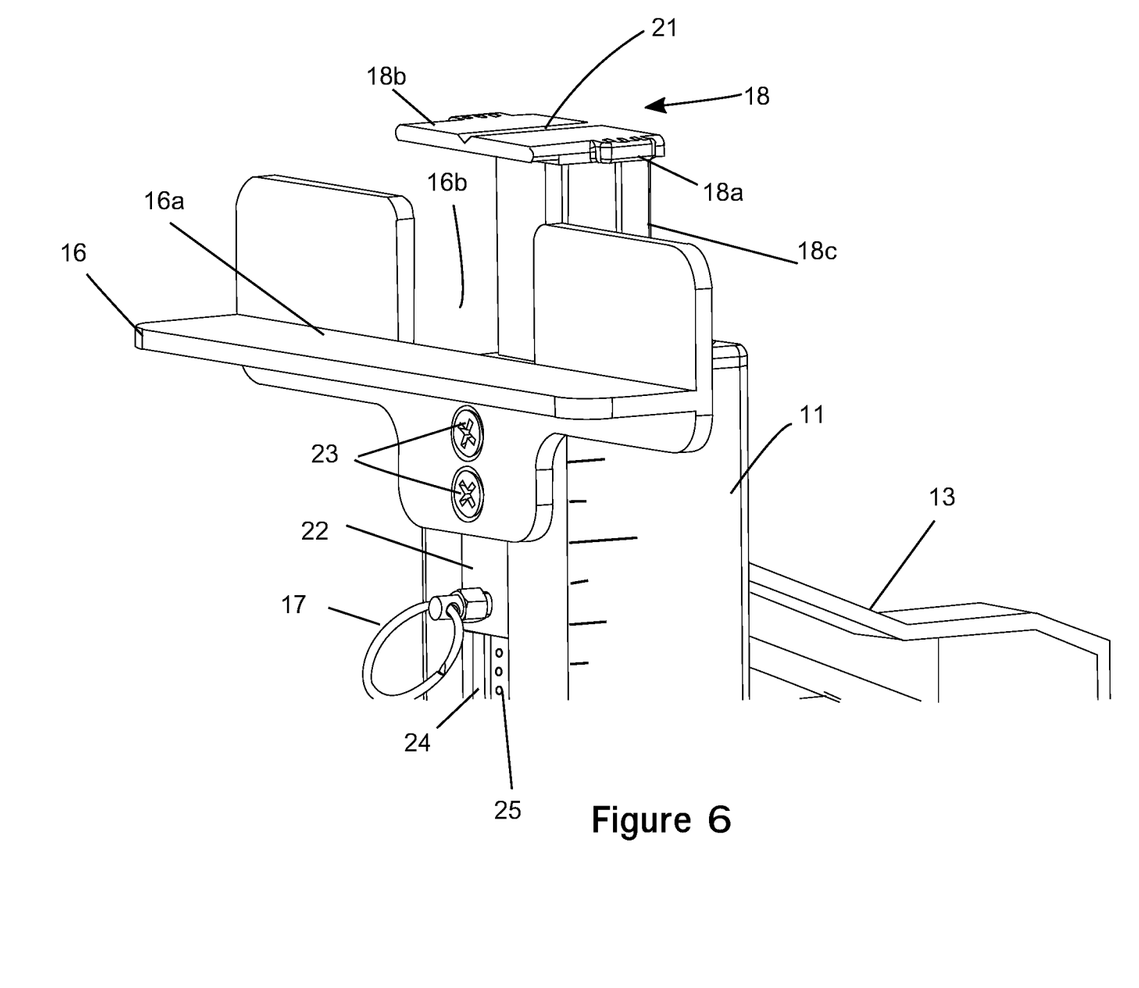
FIG. 6 is a detail of the upper portion of the tool with the tongue partially extended.

FIG. 6 is a detail of the upper portion of the tool with the tongue partially extended. Here, the top tray 16 is shown along with the pin 17. Note that, as in FIG. 5, the slider 22 is shown in the track 24 with holes 25. Note, also, the screws 23 that secure the top tray 16 to the slider 22. The top tray 16 has a notch 16b formed in it, which allows the ruled tongue 18 to be raised or lowered without interference. The top plate 18b of the tongue is shown along with the face plate 18c. Note the V-groove 21. Note too, the finger grips 18a are shown. Finally, a portion of the handle 13 is shown extending from the body 11 as in FIG. 5.

Figure 7:
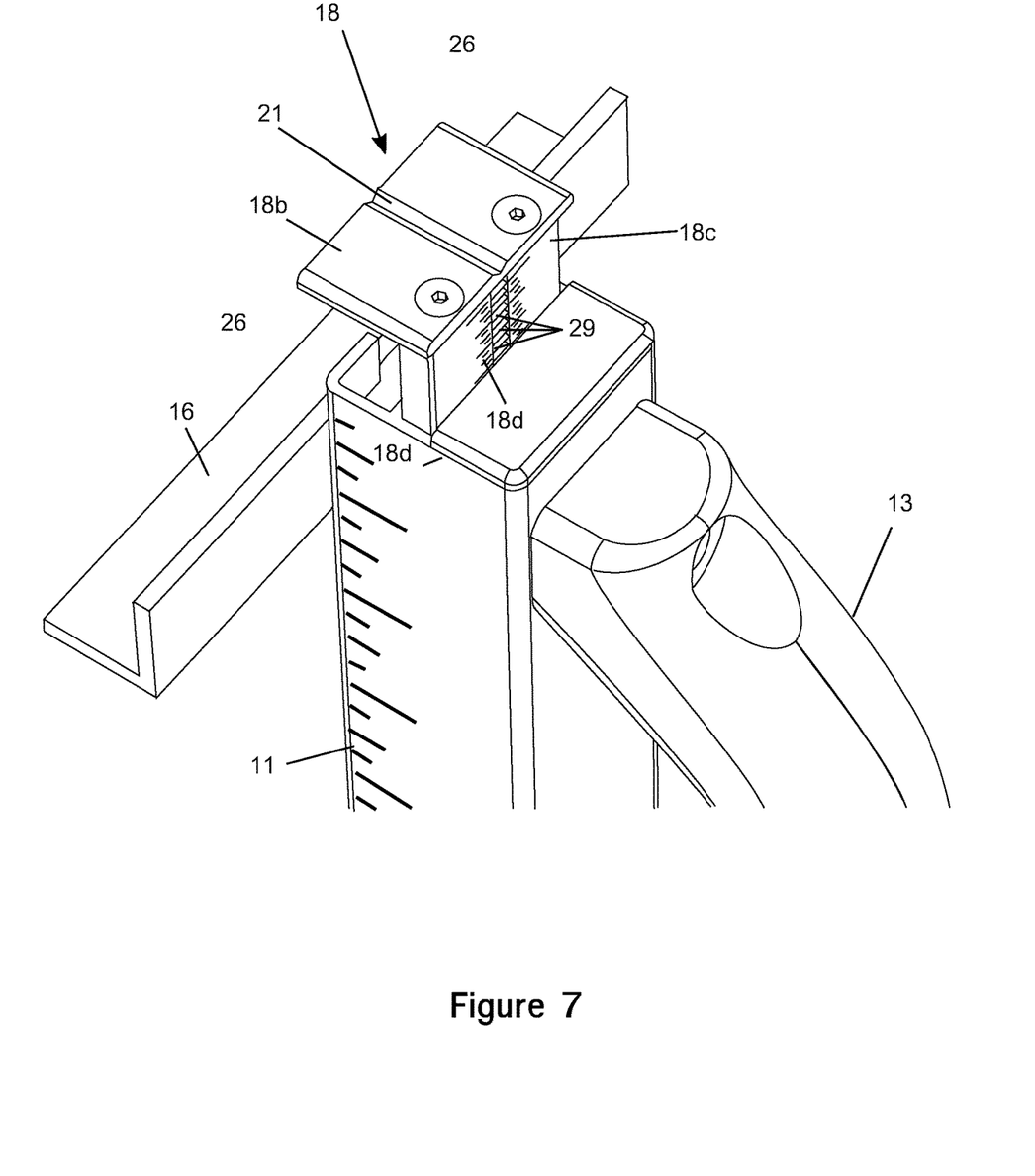
FIG. 7 is a top perspective view of the tool showing the tongue partially extended.

FIG. 7 is a top perspective view of the tool showing the tongue partially extended. In this view, the top portion of the tool is shown. The top tray 16, and portions of the body 11 and the handle 13 are shown. Note in this embodiment, the finger grips 18a are not shown. As noted above, the tongue 18 has a top plate 18b, which is secured to the face plate 18c with screws 26. Note that the face plate has ruled lines 18d (see also FIG. 8). The use of these lines and the V-groove 21 are discussed below. Note too, the tongue has locking teeth 29 formed in the rear face, as shown.

Figure 8:
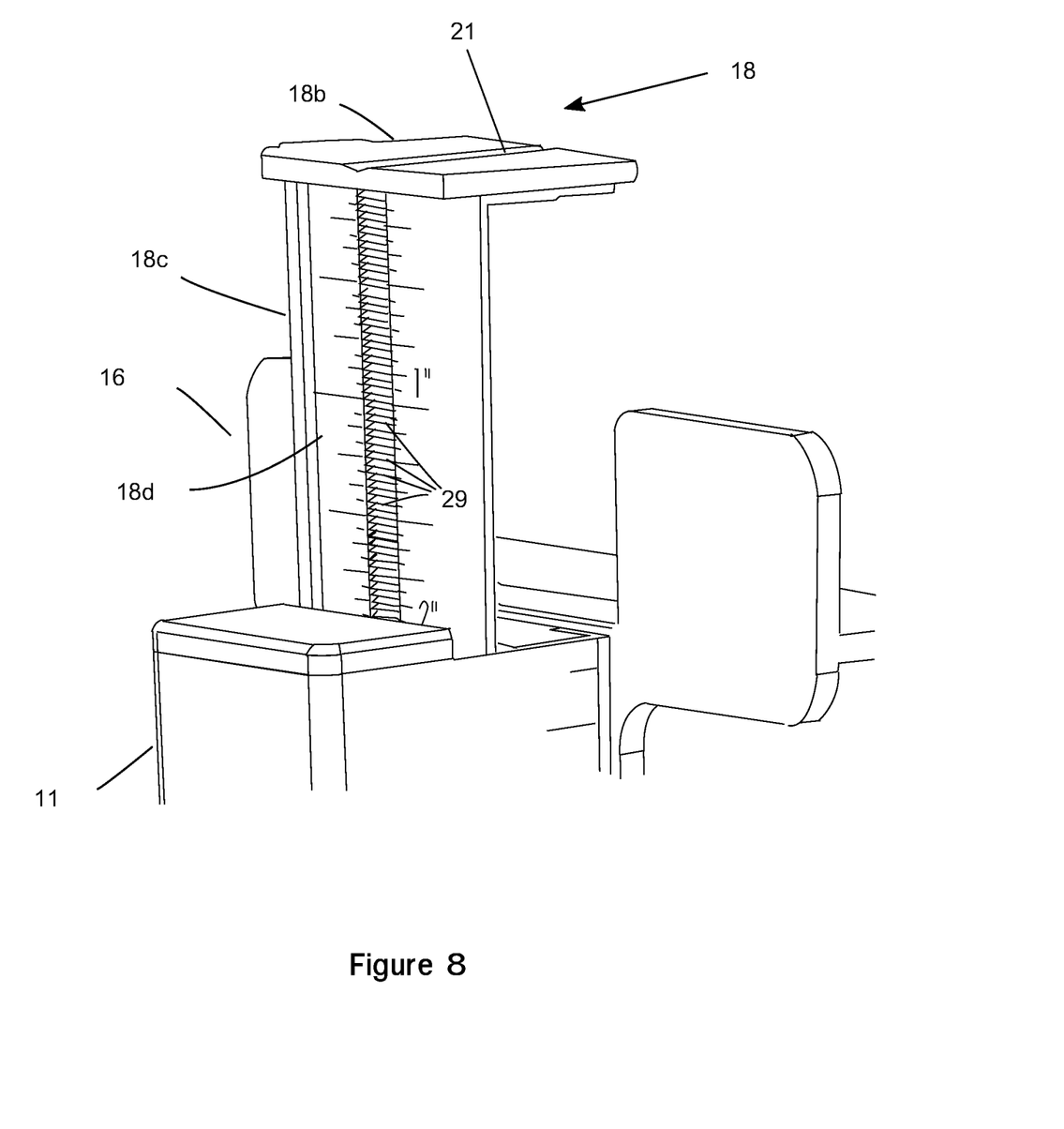
FIG. 8 is a detail view of the tongue extended, showing the locking teeth.

FIG. 8 is a detail of the tongue extended. Here, the top tray 16 is shown as well as the tongue 18. Note the face plate 18c is shown with the ruled markings 18d clearly shown. Note too the V-groove 21 in the top plate 18b. Finally, the teeth 29 are shown in the rear face as shown. These teeth allow the tongue to be locked with the locking arm 30, which is inside the body 11 (see FIG. 4).

Figure 9:
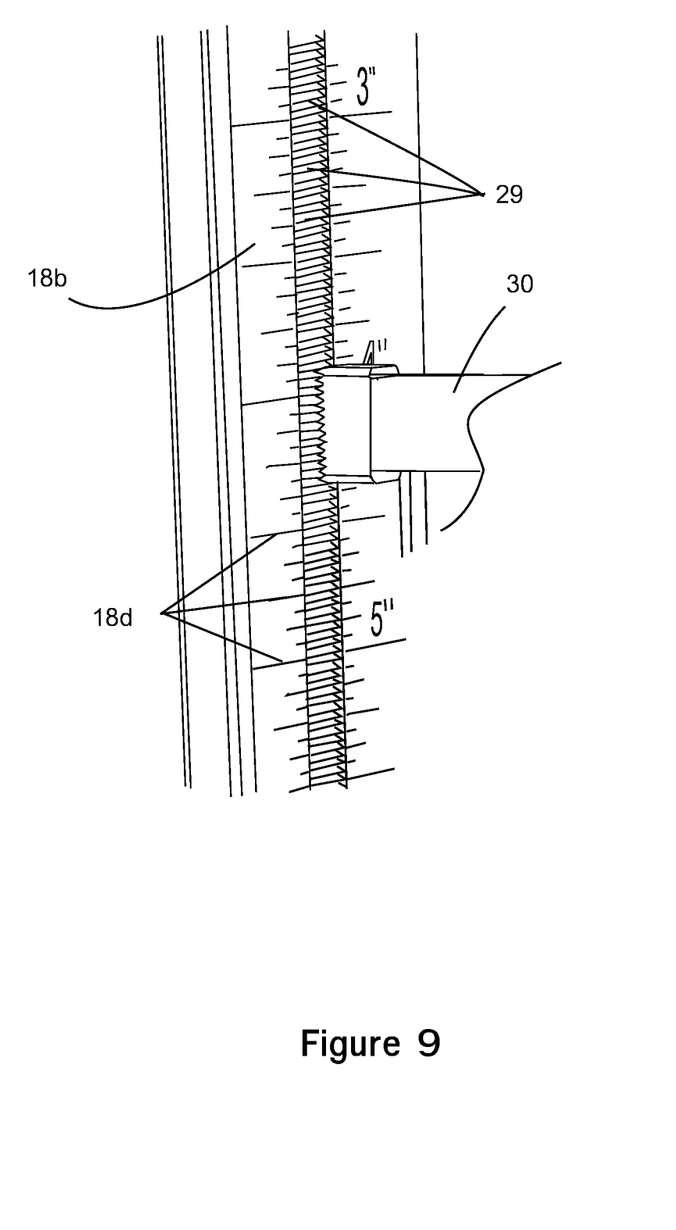
FIG. 9 is a detail view of the tongue showing the locking arm in place.

FIG. 9 is a detail view of the tongue showing the locking arm 30 engaged. Here, the locking arm 30 is shown engaging the teeth 29. When engaged, the teeth in the locking arm 30 prevent the tongue from moving. To unlock the tongue 18, the locking arm is retracted and the tongue can be stored away as before.

Figure 10:
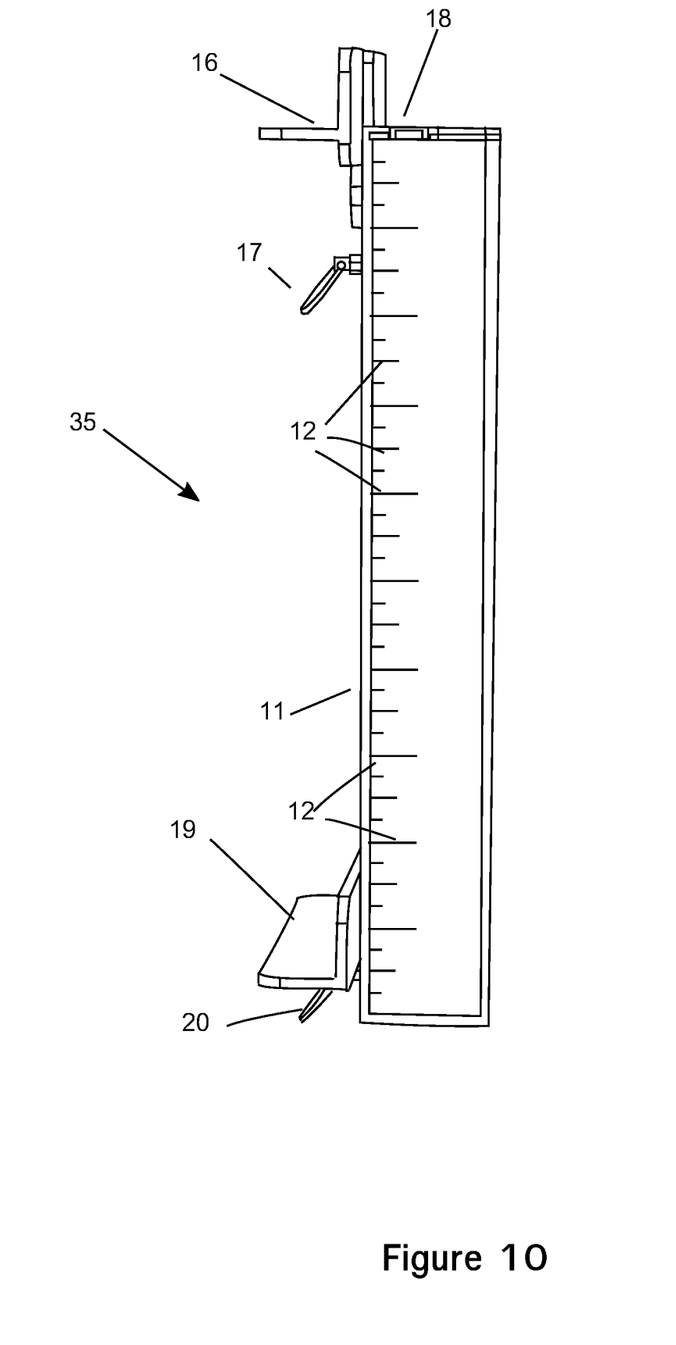
FIG. 10 is a side view of a second embodiment of the invention.
Figure 11:
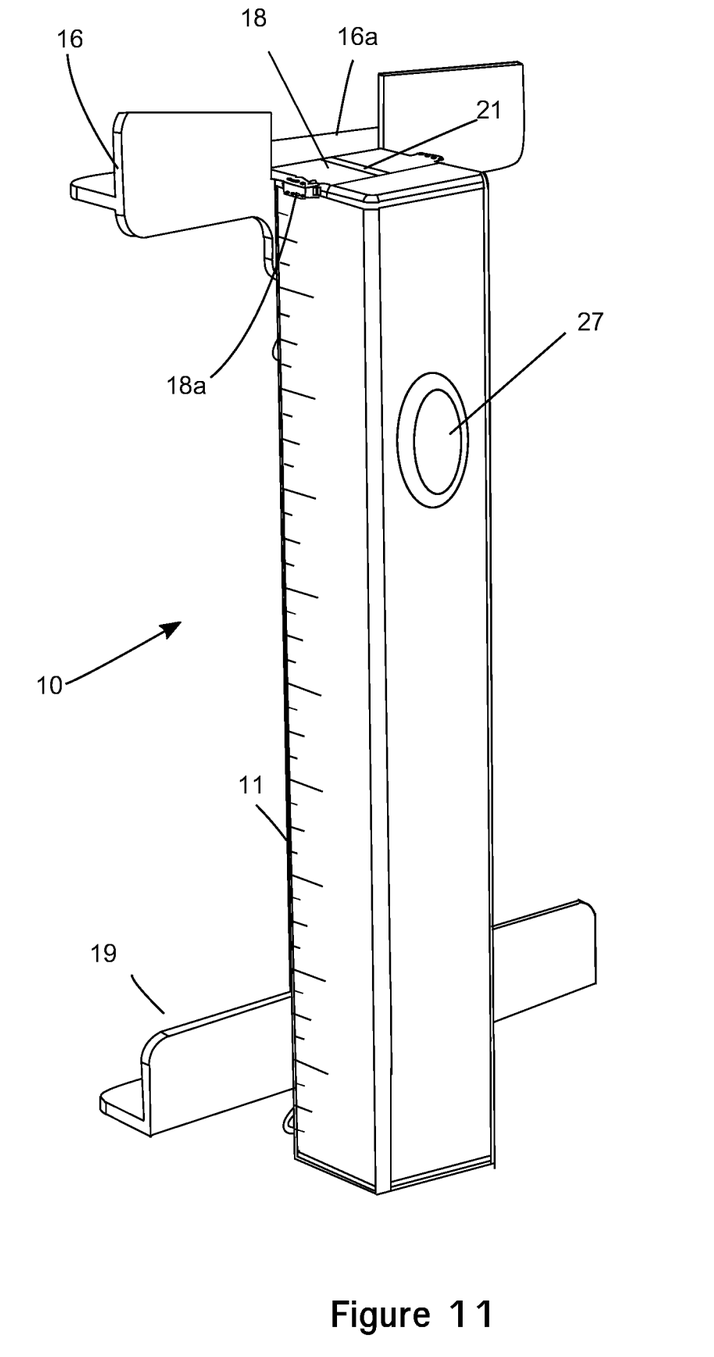
FIG. 11 is a rear perspective view of the second embodiment.
Figure 12:
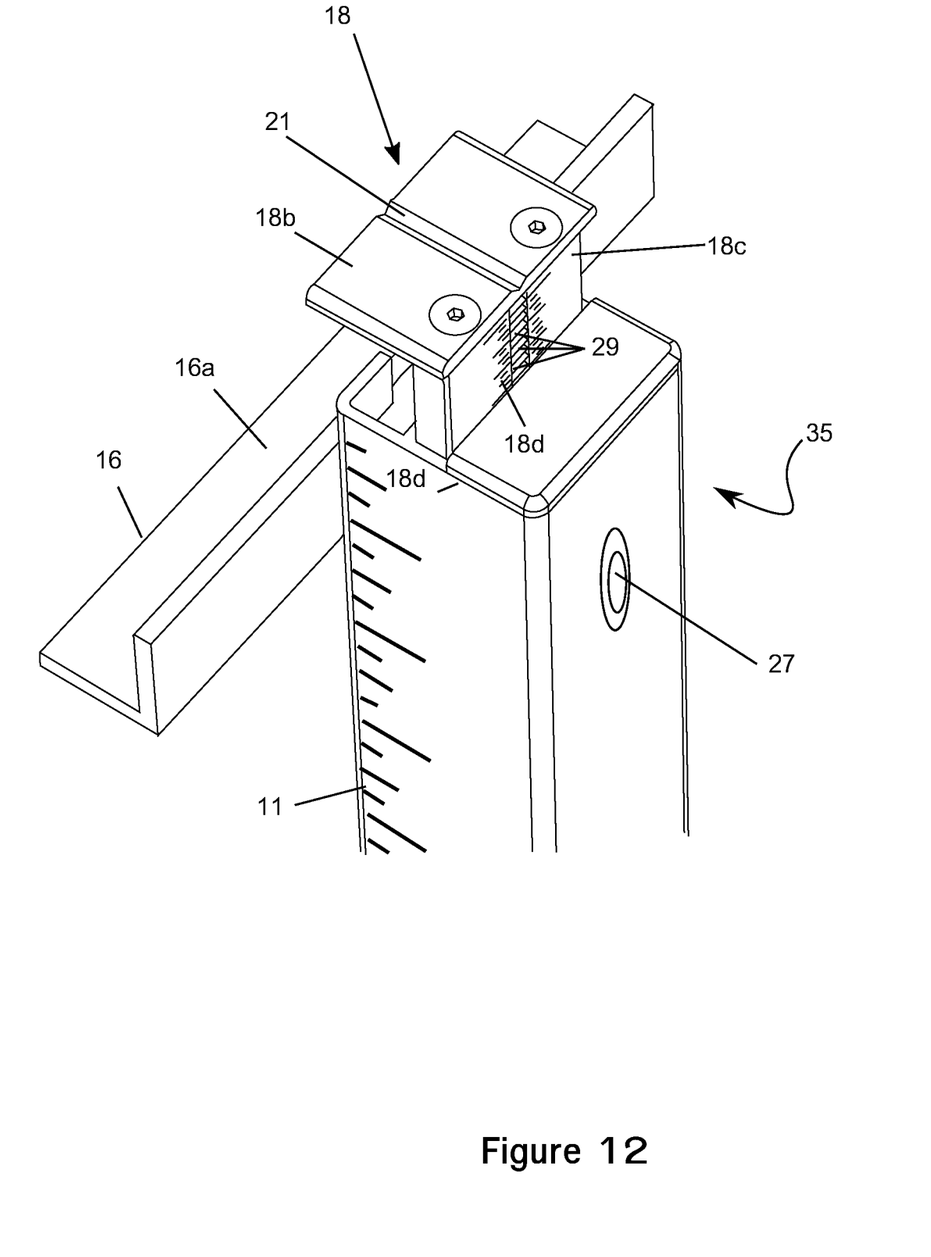
FIG. 12 s a detail of the upper portion of the second embodiment with the tongue partially extended.

FIGS. 10-12 illustrate a second embodiment of the invention. In this embodiment the handle is omitted. This unit is designed to homeowners, do-it-yourselfers and craftspersons who do not do a lot of siding work. It is lighter in weight and is easier to use for small jobs.

FIG. 10 is a side view of a second embodiment of the invention. In this embodiment, the only real change is that the handle 13 is omitted. That means that a button 27 is used instead of a trigger. All other features of the tool are the same as the first embodiment, except that there is no need to provide holes for securing the handle in the tubular body 11. Thus the tool 35 has a generally square, tubular body 11. In the preferred embodiment, the body 11 has ruled markings 12 for measurement on one or both sides. At the back of the body 11 is a button 27 that acts as the trigger in the first embodiment to lock the tongue.

At the top of the tool 35 is a flange or tray 16 This tray has a blade portion that is secured to the body 11 by a pull pin 17. Also at the top of the body 11 is a ruled tongue 18. When stored, the tongue 18 is flush with the top of the device. At the bottom of the tool 35 is a second tray 19. This tray is secured, as discussed below, by a pull pin 20. Both pins 17 and 20 are used to allow the trays to slide up or down on the face of the body to enable the user to adjust the trays to match the thickness of the clapboards being installed.

FIG. 11 is a rear perspective view of the second embodiment 35. In this view, the top of the body 11 is visible and portions of the top tray 16 and the bottom tray 19. The top of the ruled tongue 18 is shown. As discussed above, the tongue is shown flush with the surface 16a of the top tray. Also on the top surface of the tongue 18 is a V-groove 21, which is discussed in more detail below. In this view the button 27 is shown. This button acts like a switch to lock and unlock the tongue when it is deployed. Note that the locking mechanism is inside of the body 11 (see, e. g., FIG. 4).

FIG. 12 s a detail of the upper portion of the second embodiment 35 with the tongue partially extended. Here, the top tray 16 is shown. Note the face plate 18c is shown with the ruled markings 18d clearly shown. Note too the V-groove 21 in the top plate 18b. Finally, the teeth 29 are shown in the rear face as shown. These teeth allow the tongue to be locked with the locking arm 30, which is inside the body 11 (see FIG. 4).

To use the tool either 10 or 35, it is best to use two tools. This allows each tool to support an end of the board to be applied. First, set the top tray 16 to the zero mark at the top of the tool (see, FIGS. 4 and 5). The top of the tray 16 should be flush with the tape measure/tongue 18 (see FIG. 2). Set the bottom tray 19 so that it gives you the overlap you desire for the height of the board being used. Determine where the first course is to start on the structure. Affix the first course to the structure when level has been achieved. Place the bottom tray 19, on the bottom of the last course, applying upward pressure on the tool, place the next course on the top tray and affix. The bottom tray must be in contact with the last course when applying all courses. Repeat for each course.

Eventually, a point will be reached where the next course to be applied must be notched out for a door or window. When this happens, for example, on the bottom of a window, hold the tool 10 or 35 under the window with the bottom tray 19 resting (with upward pressure) on the last course applied. Depress the trigger 14 or button 27, and raise the tongue 18 above the top tray 16 until it touches the bottom of the window. Release the trigger 14 or button 27), which locks the tongue 18 in place. The tongue 18 now reads the height of a horizontal line under the window to be transferred to the next course applied. Next, place the top tray of the tool, against the next course to be applied, and transfer the measurement by making a horizontal mark at the top of the tongue. A pencil can be placed in the V-groove 21 to hold the pencil steady while the line is drawn. This gives the height of the clapboard to be removed to fit around the window. Releasing the trigger or button allows the tongue 18 to retract. By using a pencil (marking device) to push the tape measure down (again using the V-groove, the vertical lines of the cut can be drawn.

At the top of a window, place a straight edge on top of the window frame, and extend it at least (3") past the edge of the window frame.

As with the bottom of a window, hold upward pressure upon the bottom tray 19 on the last course applied. Raise the tongue 18 until it reaches the bottom of the straight edge and leave the tongue 18 locked in place.

Press the top tray 16 against the next course to be applied, and transfer your horizontal line by making a mark at the top of the tongue 18, as discussed above.

Releasing the trigger allows you to retract the tongue 18 with the pressure of your pencil (marking device) which will transfer the vertical lines.

When a door must be notched out, place a straight edge along the top of the door frame so that it sticks out past the side of the frame at least three inches (3"). As in the case of the window, raise the tongue 18, so that the tongue rests at the bottom of the straight edge. Leave the tongue locked in place and transfer the horizontal lay out line, to the next course applied. Lay out vertical lines as done with the window.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A hand-held tool for spacing clapboards with built-in extendible ruler comprising:
    a) a tubular body having a top and a bottom and at least two parallel sides and a width;
    b) a top tray having two ends and being, slidably attached to said tubular body, said upper tray extending perpendicular to said tubular body and having a length at least 3 times the width of said tubular body said top tray having a lower flange extending outwardly from said tubular body, a first vertical flange attached to one of two ends of said top tray and a second vertical flange, being spaced apart from said first vertical flange and being attached at the second of two ends of said top tray, said first and second vertical flanges having a spaced formed therebetween;
    c) a bottom tray, slidably attached to said tubular body, said bottom tray extending perpendicular to said tubular body and having a length at least 3 times the width of said tubular body;
    d) a tongue, slidably installed in said tubular body and extendable upwardly therefrom, said tongue having a horizontal top plate and a vertical face attached to said top plate and descending downwardly therefrom;
    f) a locking mechanism operably installed adjacent to said tongue; and
    g) an operating switch, in operable communication with said locking mechanism, to lock said tongue in an extended position and to unlock said tongue for storage.

2. The hand-held tool for spacing clapboards of claim 1 wherein operating switch comprises:
    a) a button, attached to said tubular body.

3. The hand-held tool for spacing clapboards of claim 1 further comprising a plurality ruled markings formed on said tubular body.

4. The hand-held tool for spacing clapboards of claim 1 wherein the tongue further comprises a plurality of ruled markings on said vertical face.

5. The hand-held tool for spacing clapboards of claim 1 wherein said top tray and bottom tray are secured in place by removable pins.

6. The hand-held tool for spacing clapboards of claim 1 wherein said top plate of said tongue has a V-groove formed therein.

7. The hand-held tool for spacing clapboards of claim 1 wherein said tongue has a plurality of teeth formed thereon.

8. The hand-held tool for spacing clapboards of claim 7 wherein said locking mechanism has a head formed thereon, said head having a plurality of teeth.

9. The hand-held tool for spacing clapboards of claim 8 wherein, when said locking mechanism is engaged, said teeth on said head of said locking mechanism engage the teeth formed on said tongue.

10. A hand-held tool for spacing clapboards with built-in extendible ruler comprising:
   a) a tubular body having a top and a bottom and at least two parallel sides and a width;
   b) a handle, attached to said tubular body;
   c) a top tray having two ends and being, slidably attached to said tubular body, said upper tray extending perpendicular to said tubular body and having a length at least 3 times the width of said tubular body said top tray having a lower flange extending outwardly from said tubular body, a first vertical flange attached to one of two ends of said top tray and a second vertical flange, being spaced apart from said first vertical flange and being attached at the second of two ends of said top tray, said first and second vertical flanges having a spaced formed therebetween;
   d) a bottom tray, slidably attached to said tubular body, said bottom tray extending perpendicular to said tubular body and having a length at least 3 times the width of said tubular body;
   e) a tongue, slidably installed in said tubular body and extendable upwardly therefrom, said tongue having a top plate and a vertical face extending downwardly therefrom;
   f) a locking mechanism operably installed adjacent to said tongue; and
   g) a trigger, attached to said handle and in operable communication with said locking mechanism, to lock said tongue in an extended position and to unlock said tongue for storage.

11. The hand-held tool for spacing clapboards of claim 10 further comprising a plurality ruled markings formed on said tubular body.

12. The hand-held tool for spacing clapboards of claim 10 wherein the tongue further comprises a plurality of ruled markings on said vertical face.

13. The hand-held tool for spacing clapboards of claim 10 wherein said top tray and bottom tray are secured in place by removable pin.

14. The hand-held tool for spacing clapboards of claim 10 wherein said top face of said tongue has a V-groove formed therein.

15. The hand-held tool for spacing clapboards of claim 10 wherein said tongue has a plurality of teeth formed thereon.

16. The hand-held tool for spacing clapboards of claim 15 wherein said locking mechanism has a head formed thereon, said head having a plurality of teeth.

17. The hand-held tool for spacing clapboards of claim 16 wherein, when said locking mechanism is engaged, said teeth on said head of said locking mechanism engage the teeth formed on said tongue.

\* \* \* \* \*